US006848695B2

(12) United States Patent
Panasewicz et al.

(10) Patent No.: US 6,848,695 B2
(45) Date of Patent: Feb. 1, 2005

(54) STACKABLE YARD CART

(75) Inventors: Dale A. Panasewicz, Strongsville, OH (US); Dennis Futo, Strongsville, OH (US); Jeffrey Kalman, Cleveland Heights, OH (US); Renard J. Passerell, Litchfield, OH (US)

(73) Assignee: UnionTools, Inc., Columbus, OH (US)

( * ) Notice: Subject to any disclaimer, the term of this patent is extended or adjusted under 35 U.S.C. 154(b) by 0 days.

(21) Appl. No.: 10/375,277

(22) Filed: Feb. 27, 2003

(65) Prior Publication Data

US 2004/0017055 A1 Jan. 29, 2004

Related U.S. Application Data

(60) Provisional application No. 60/361,082, filed on Mar. 1, 2002.

(51) Int. Cl.[7] ......................... B62D 63/00; B62D 21/00; B62B 1/00; B62B 7/02
(52) U.S. Cl. ........................... 280/33.998; 280/47.131; 280/47.315; 280/655.1; 280/79.2; D34/16; D34/24; 206/499
(58) Field of Search ...................... 280/33.991–33.998, 280/651–655.1, 47.31–47.32, 47.815, 43.1, 47.34, 47.26, 659, 499, 79.2, 47.131; 206/503–505, 509, 499; D34/12–27

(56) References Cited

U.S. PATENT DOCUMENTS

| | | | | | |
|---|---|---|---|---|---|
| 3,361,439 A | * | 1/1968 | Olson | ........................ | 280/43.1 |
| 3,552,760 A | * | 1/1971 | Sine | ........................... | 280/653 |
| 3,826,511 A | * | 7/1974 | Frank | .......................... | 280/653 |
| 4,261,596 A | * | 4/1981 | Douglas | ..................... | 280/652 |
| 5,149,115 A | * | 9/1992 | Sampedro | ............. | 280/33.998 |
| 5,645,290 A | * | 7/1997 | Gaffney et al. | ........ | 280/33.998 |
| 5,692,761 A | * | 12/1997 | Havlovitz | ............. | 280/33.994 |
| 6,203,034 B1 | * | 3/2001 | Houry | ..................... | 280/47.34 |
| 6,536,786 B1 | * | 3/2003 | Katoozian | ............. | 280/33.993 |
| 2001/0045371 A1 | * | 11/2001 | Ordonez | .................... | 206/499 |

FOREIGN PATENT DOCUMENTS

| DE | 4300395 A1 | * | 3/1994 | ............. B62B/1/02 |
|---|---|---|---|---|
| GB | 2206317 A | * | 1/1989 | ............. B62B/1/20 |

* cited by examiner

Primary Examiner—Christopher P. Ellis
Assistant Examiner—G B Klebe
(74) Attorney, Agent, or Firm—Porter, Wright, Morris & Arthur, LLP

(57) ABSTRACT

A stackable cart upon which another cart can be stacked thereon includes a tray, a handle connected to the tray, and a plurality of wheels rotatably secured to the tray. The tray is configured to at least partially receive a handle of the another cart when the another cart is stacked on the stackable cart. The handle is configured to at least partially receive a plurality of wheels of the another cart when the another cart is stacked on the stackable cart. A plurality of the carts can be stored vertically with the carts oriented in alternating opposed directions. The carts are preferably nested together in a compact manner. In some disclosed embodiments the handle is a handle movable between an extended position and a retracted position and/or the cart includes a stand movable between a stowed position and an extended position.

18 Claims, 9 Drawing Sheets

# STACKABLE YARD CART

CROSS-REFERENCE TO RELATED APPLICATIONS

This application claims priority benefit of U.S. Provisional Patent Application No. 60/361,082 filed on Mar. 1, 2002, the disclosure of which is expressly incorporated herein its entirety.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to yard equipment and, more particularly, to a stackable yard cart.

BACKGROUND OF THE INVENTION

Yard equipment is typically difficult to store and difficult to transport. Businesses or individuals that require a significant number of wheelbarrows or carts, for example, require a great deal of space to store this equipment. Further, should it be necessary to transport this equipment to a work location, it may be necessary to decide between not taking all of the available equipment or making multiple trips to move the equipment; both are not optimal choices. Accordingly, there is a need in the art for an improved yard cart.

SUMMARY OF THE INVENTION

A yard cart according to the present invention overcomes at least some of the above noted and other deficiencies. According to one aspect of the present invention, a stackable cart includes a tray, a handle connected to the tray, and a plurality of wheels rotatably secured to the tray. The tray is configured to at least partially receive a handle of another cart when the another cart is stacked on the stackable cart. The handle is configured to at least partially receive a plurality of wheels of the another cart when the another cart is stacked on the stackable cart.

According to another aspect of the present invention, a stacked configuration of carts includes first and second carts each including a tray, a handle connected to the tray, and a plurality of wheels rotatably secured to the tray. The second cart is vertically stacked upon the first cart with the second cart oriented in an opposed direction to the first cart. The tray of the first cart at least partially receives the handle of the second cart therein to limit movement of the second cart relative to the first cart. The handle of the first cart at least partially receives the plurality of wheels of the second cart therein to limit movement of the second cart relative to the first cart.

According to yet another aspect of the present invention, a method of stacking carts includes the steps of providing first and second carts each including a tray, a handle connected to the tray, and a plurality of wheels rotatably secured to the tray and vertically stacking the second cart upon the first cart with the second cart oriented in an opposed direction to the first cart. The handle of the second cart is at least partially inserted into the tray of the first cart to limit movement of the second cart relative to the first cart. The plurality of wheels of the second cart at least partially inserted into the handle of the first cart to limit movement of the second cart relative to the first cart.

From the foregoing disclosure and the following more detailed description of various preferred embodiments it will be apparent to those skilled in the art that the present invention provides a significant advance in the technology and art of yard equipment. Particularly significant in this regard is the potential the invention affords for providing a high quality, reliable, low cost stackable assembly. Additional features and advantages of various preferred embodiments will be better understood in view of the detailed description provided below.

BRIEF DESCRIPTION OF THE DRAWINGS

These and further features of the present invention will be apparent with reference to the following description and drawing, wherein.

Figure 1:
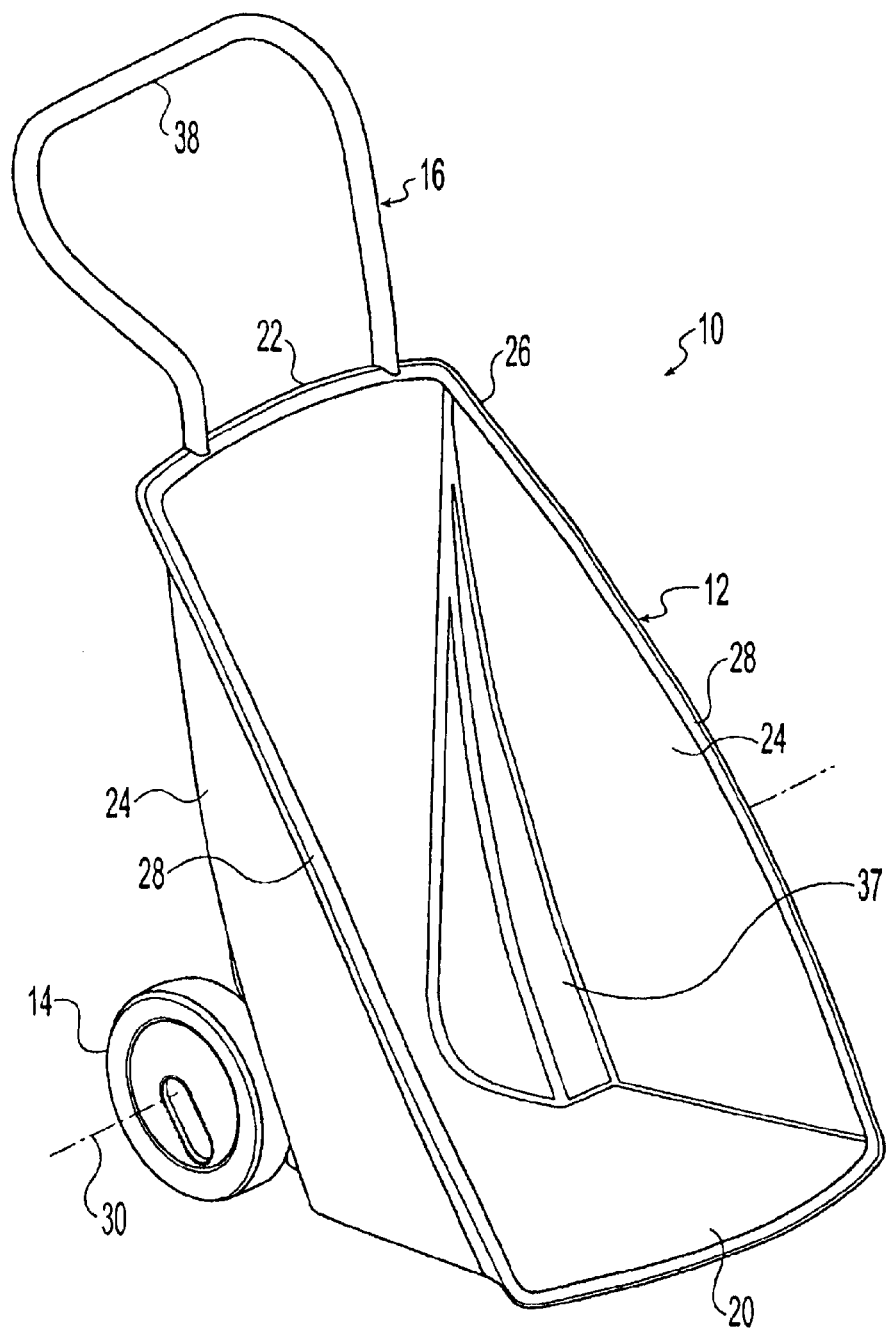
FIG. 1 is a front perspective view of a yard cart according to a first embodiment of the present invention wherein the cart is in a generally vertical orientation.

It should be understood that the appended drawings are not necessarily to scale, presenting a somewhat simplified representation of various preferred features illustrative of the basic principles of the invention. The specific design features of a yard cart as disclosed herein, including, for example, specific dimensions and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the control pedal assembly illustrated in the drawings. In general, up or upward refers to an upward direction within the plane of the paper in FIG. 1 and down or downward refers to a downward direction within the plane of the paper in FIG. 1. Also in general, fore or forward refers to a direction toward the front of the yard cart when it is resting on its bottom wall, that is, a rightward direction within the plane of the paper in FIG. 1 and aft or rearward refers to a direction toward the rear of the yard cart when it is resting on its bottom wall, that is, a leftward direction within the plane of the paper in FIG. 1.

DETAILED DESCRIPTION OF CERTAIN PREFERRED EMBODIMENTS

A preferred embodiment of the present invention and its advantages are best understood by referring to FIGS. 1 to 5 wherein like reference numerals are used for like and corresponding parts of the various figures. It will be apparent to those skilled in the art, that is, to those who have knowledge or experience in this area of technology, that many uses and design variations are possible for the improved yard carts disclosed herein.

Figure 2:
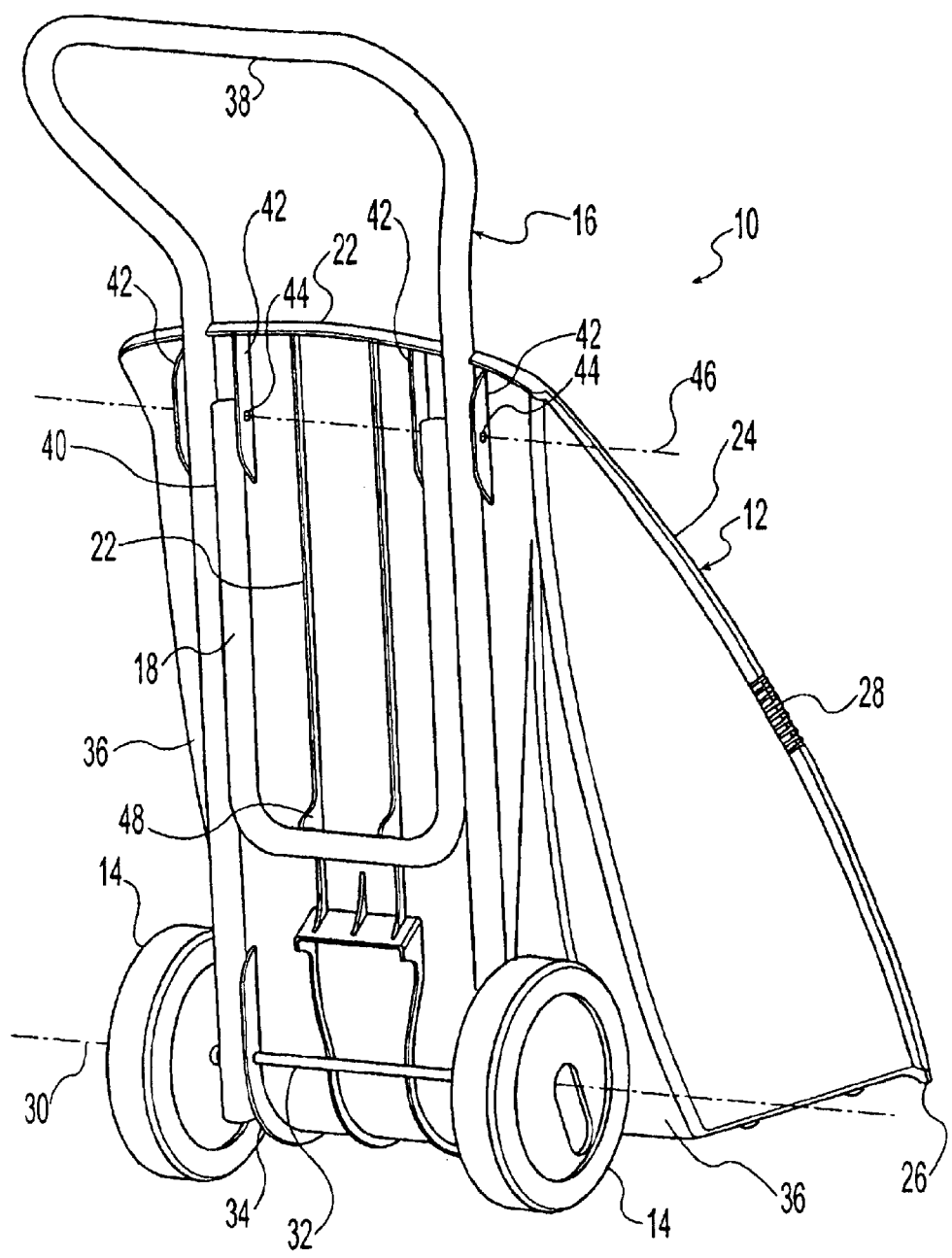
FIG. 2 is a rear prospective view of the stackable yard cart of FIG. 1.
Figure 3:
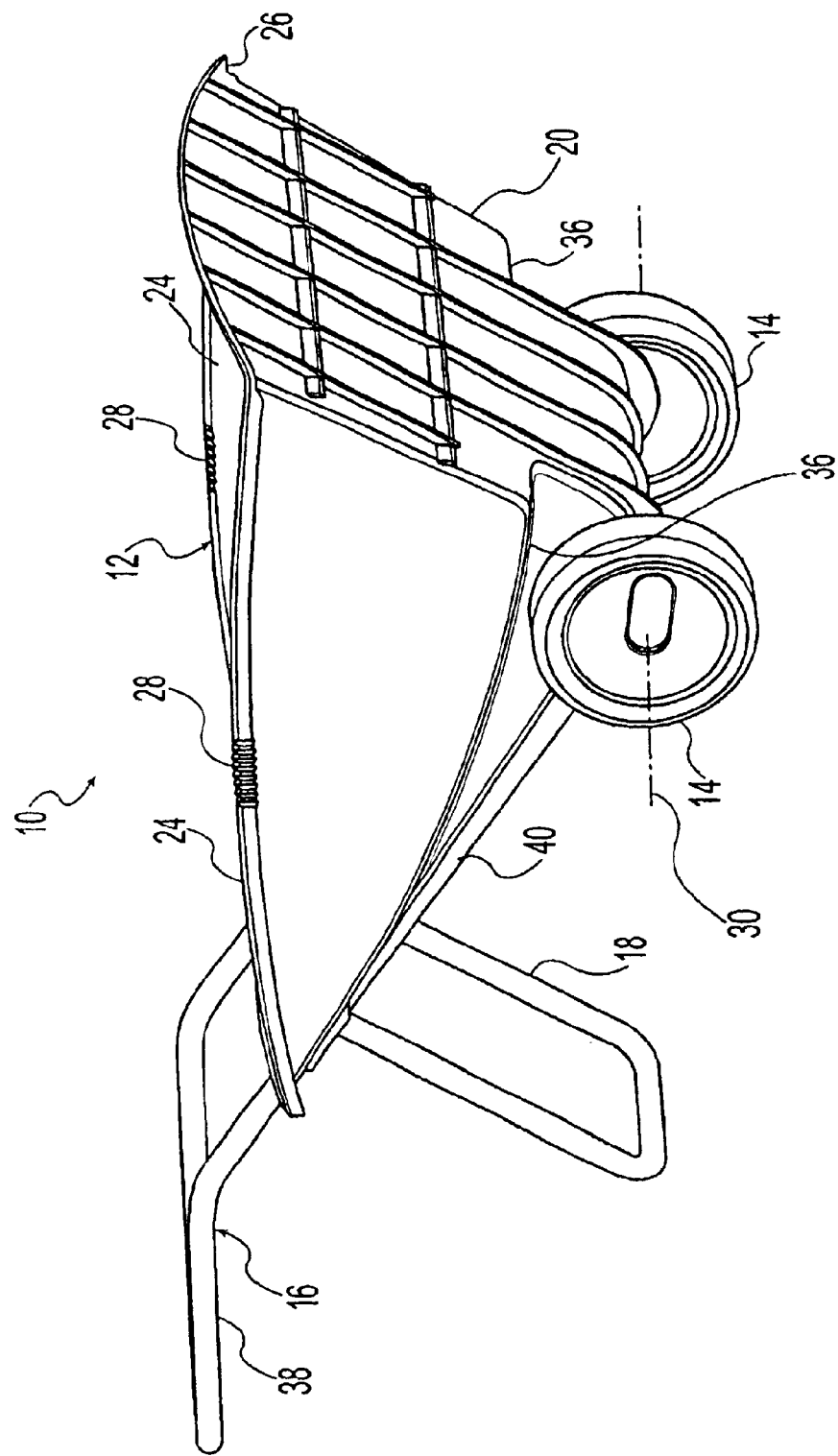
FIG. 3 is a front prospective view of the yard cart of FIGS. 1 and 2 wherein the yard cart is in a generally horizontal orientation and a stand is in an extended position.

Referring now to the drawings, FIGS. 1 to 3 show a yard cart 10 according to a first embodiment of the present invention. Generally, the yard cart 100 includes a tray 12, a pair of wheels 14, a handle 16, and a stand 18. The tray 12 may be made of any suitable material such as, for example, plastic, metal or any other appropriate materials.

The illustrated tray 12 includes a generally planar bottom wall 20, a generally planar back wall 22 upwardly extending from a rear edge of the bottom wall 20, and a pair of generally planar side walls 24 upwardly extending from lateral edges of the bottom wall 20 to lateral edges of the back wall 22. The back wall 22 is generally perpendicular to the bottom wall 20 and the side walls 24 and the side walls 24 are generally perpendicular to bottom wall 20 and the back wall 22. The illustrated side walls 24 are generally triangular shaped such that the walls 20, 22, 24 form a generally wedge-shaped interior storage cavity in which objects can be placed to be carried by the yard cart 10. The illustrated free edge of each of the side walls 24 is arcuate or convex curved between the bottom wall 20 and the back wall 22. The illustrated free edge of the bottom wall 20 is arcuate or convex curved between the side walls 24. The illustrated free edge of the back wall 22 is arcuate or convex curved between the side walls 24. It is noted that other shapes and sizes of the walls 20, 22, 24 and the cavity can be utilized within the scope of the present invention.

In the illustrated embodiment, the tray 12 is provided with a lip 26 which runs along the outer periphery of the cavity, that is, along the free edges of the walls 20, 22, 24. The lip 26 is preferably sized and shaped to increase the structural rigidity and/or strength of the tray 12. The illustrated lip 26 is generally U-shaped in cross section but other suitable shapes can be utilized. The illustrated lip 26 is provided with grips 28 for grasping the tray 12. The illustrated grips 28 are formed by a plurality of spaced apart protrusions 37 and/or recesses molded therein which form a generally slip resistant surface. It is noted that the grips 28 can include and/or be formed by an additional material such as, for example, rubber or other suitable materials. The illustrated lip 26 includes a pair of the grips 28 which are located on the opposed side walls 24 near the center of the free edge of the side walls 24. It is noted, however, that the grips 28 can have other sizes and/or locations and that other quantities of the grips 28 can be utilized.

The pair of wheels 14 are preferably rotatably mounted to the tray 12 along a common, transversely extending axis of rotation 30. The wheels 14 can be formed of any suitable material and can be solid, hollow, or pneumatic. The illustrated wheels 14 are secured to the back wall 22 of the tray 12 in a position behind the back wall 22 in which they engage the ground or other support surface when the bottom wall 20 is resting on the ground. The wheels 14 are preferably connected to the tray 12 by a transversely extending axle 32. The illustrated axle 32 is secured to the tray by extending through openings in two pairs of laterally spaced apart lower flanges 34 which rearwardly extend from the back wall 22. The illustrated lower flanges 34 are molded in the tray 12 but can alternatively be formed separately and attached thereto. It is noted that the axle 32 can be secured to the tray 12 and the wheels 14 can be secured to the axle 32 by any suitable means which allows the wheels 14 to rotate relative to the tray 12 about the axis of rotation 30. It is also noted that a single wheel 14 or more than two wheels 14 can alternatively be utilized within the scope of the present invention.

The wheels 14 are preferably sized and positioned such that the width or transverse distance between the outer sides of the wheels 14 is less than the width or transverse distance between the inner surfaces of the side walls 24 of the tray 12 so that the wheels 14 fit within the cavity of another cart when yard carts 10 are stacked one on top of another as described in more detail herein after. The illustrated tray 12 is provided with opposed recesses 36 in the side walls 24 for the wheels 14 such that the preferred width of the wheels 14 is obtained without the wheels 14 being entirely rearward of the back wall 22, that is, the wheels 14 extend partially forward of the back wall 14 when the yard cart 10 is resting on the bottom wall 20. It is noted that the recesses 26 can have other suitable sizes and shapes which are apparent to those skilled in the art. The recesses 36 preferably formed protrusions 37 within the cavity of the tray 12 which are sized and shaped to support the handle 16 of another yard cart when yard carts 10 are stacked one on top of another as described in more detail herein after. The illustrated protrusions 37 form generally planar and forward facing support surfaces spaced forward of the back wall within the cavity (as viewed in FIG. 1).

The handle 16 has a grasping portion 38 sized and shaped for a user to grasp when moving the yard cart 10 and a connecting portion 40 sized and shaped to secure the handle 16 to the tray 12. The illustrated handle 16 is secured to the rear of the back wall 22 such that the grasping portion 38 is located above the tray 12 when the bottom wall 20 is resting on the ground. The illustrated connecting portion 40 is pair of spaced apart tubes longitudinally extending along the rear of the back wall 22. The lower end of the tubes are connected to the back wall 22 by extending between the lower flanges 34 inward of the wheels 14 with the axle 32 passing through openings in the tubes. The upper end of the tubes are connected to the back wall 22 by extending between two pairs of laterally spaced apart upper flanges 42 which rearwardly extend from the back wall 22. Suitable fasteners or pins 44 laterally extend through openings in the upper flanges 42 and the tubes to secure the tubes to the upper flanges 42 and the tray 12. The illustrated upper flanges 42 are molded in the back wall 22 of the tray 12 but can alternatively be formed separately and attached thereto. It is noted that the connecting portion 40 of the handle 16 can alternatively be secured to the tray 12 in other suitable manners apparent to those skilled in the art.

The illustrated grasping portion 38 is a generally U-shaped tube wherein the ends extend from the upper ends of the connecting portion tubes. The illustrated grasping portion 38 of the handle 16 extends at angle relative to the back wall 22 such that it angles rearwardly when the bottom wall 20 is resting the ground (FIGS. 1 and 2) and is generally horizontal when the stand 18 is resting on the ground (FIG. 3). Preferably, the grasping portion 38 is shaped and sized with a transverse width suitable to fit between the side walls of another yard cart when yard carts 10 are stacked one on top of another as described in more detail hereinafter. The grasping portion 38 is also preferably sized and shaped such that the wheels 14 of another yard cart at least partially extend within the grasping portion 38 of the handle 16 when yard carts 10 are stacked one on top of another as described in more detail herein after. In this regard, the illustrated grasping portion 38 has side members which outwardly extend in a lateral direction from the tubes of the connecting portion 40 to a base member which extends a transverse distance greater than the transverse spacing of the tubes of the connecting portion 40.

The connecting and grasping portions 38, 40 of the illustrated handle are formed by a singled rigid tube bent into the desired shape. The tube can be formed of metal, plastic, or other suitable material. It is noted that the handle 16 can have other desired shapes such as, for example, straight or ergonomic shapes. The handle 16 may also include a grip (not shown) for forming a slip-resistant surface to more easily grasping the handle 16. The grip can be formed by a plurality of spaced apart protrusions and/or recesses molded or formed therein and/or can formed by an additional material such as, for example, rubber or other suitable materials.

The stand 18 is adapted to support the tray 12 in at least one orientation other than the generally vertical orientation wherein the bottom wall 20 is resting on the ground. As best shown in FIG. 3, the illustrated stand 18 is adapted to support the tray 12 in a generally horizontal orientation wherein the periphery of the cavity is generally horizontal. When in the position shown in FIG. 3, the tray 12 opens substantially upward, permitting use of the yard cart 10 as a Wheel barrow or a cart. Of course, the yard cart 10 can easily transition between positions The illustrated stand 18 is a retractable stand 18 in that it is movable between a stowed or "up" position (FIG. 1) and at least one extended or "down" position (FIG. 2). The stand 18 may be moved between the positions in any manner known in the art, including manually moving the stand 18. The illustrated stand 18 is in the form of a U-shaped bent tube wherein the free ends of the tube are pivotably connected to the back wall 22 of the tray 12. The tube can be metal, plastic, or any other suitable material. It is noted that the stand 18 can alternatively have other forms and shapes within the scope of the present invention. The illustrated stand 18 is pivotably connected by the transversely extending pins 44 connecting the handle 16 and extending through openings in the stand 18. The illustrated stand 18 extends between the upper flanges 42 along with the handle 16 and inward of the handle 16. Mounted in this manner, the stand 18 is pivotable about a transversely extending pivot axis 46 formed by the pins 44.

The stand 18 preferably includes a releasable lock device or retainer 48 which restricts movement of the kick stand, at least resisting movement of the stand out of the stowed position. In the illustrated embodiment, resilient members or fingers releasably hold the stand 18 in the stowed position. The resilient fingers are adapted to partially block path of the stand 18 to resist movement of the stand 18 out of the stowed position. When a suitable force is applied to the stand 18 to pivot the stand out of the stowed position, the fingers resiliently deform out of the path of the stand 18 to permit the kick stand to move out of the stowed position. When the stand 18 is moved back to the stowed position with a suitable force, the fingers resiliently deform out of the path to permit the stand 18 to be stowed and resiliently snap back into the path to again resist movement of the stand 18 out of the stowed position. The illustrated fingers are molded in the back wall 22 of the try 12 but can alternatively be formed separately and attached thereto. It is noted that the releasable retainer 48 can take other forms to restrict the free movement of the stand 18 such as, for example, it can restrict movement out of the stored position and the extended position and/or restrict movement from other positions.

Figure 4:
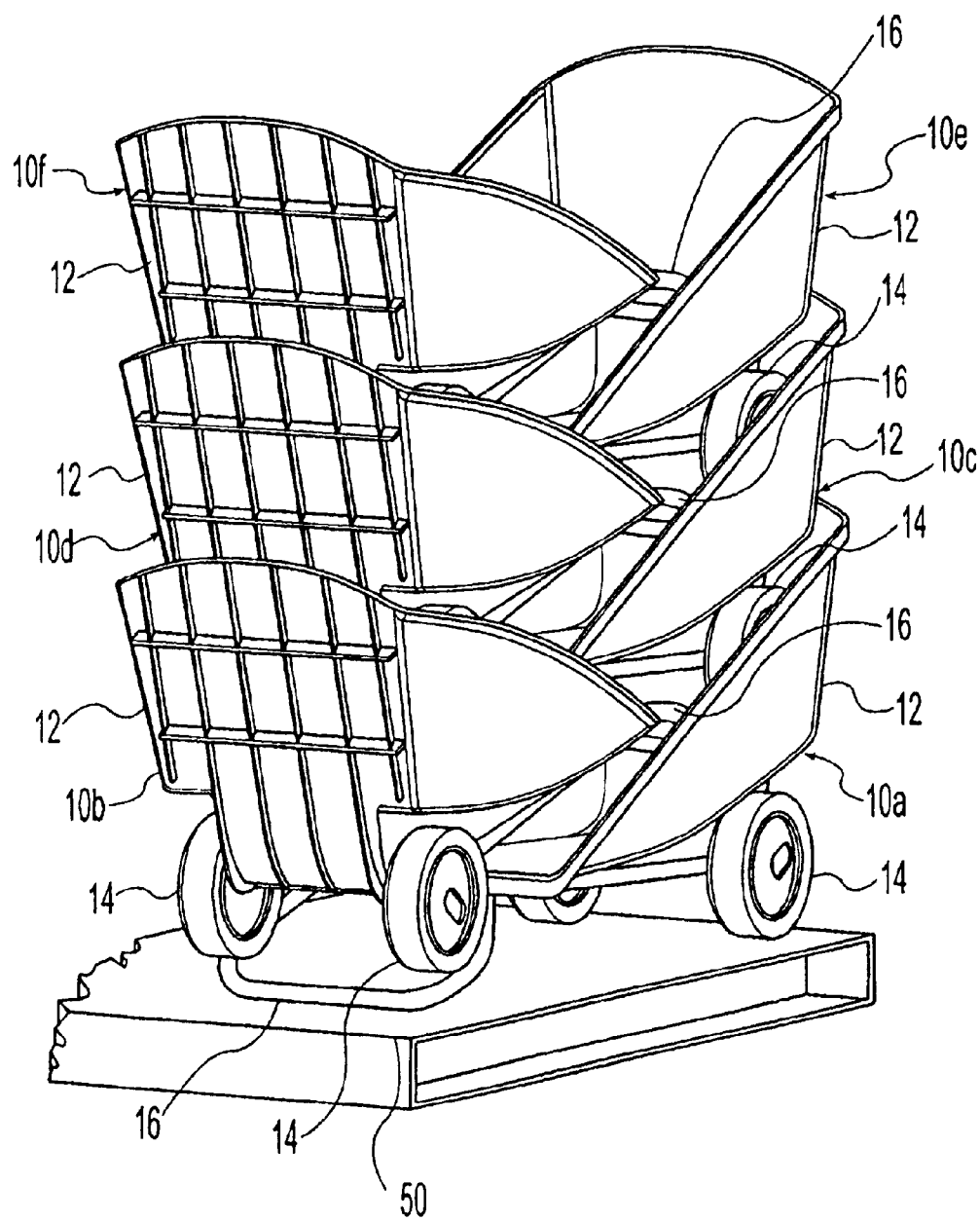
FIG. 4 is a perspective view of several of the yard carts of FIGS. 1 to 3 stacked in a storage configuration according to the present invention.
Figure 5:
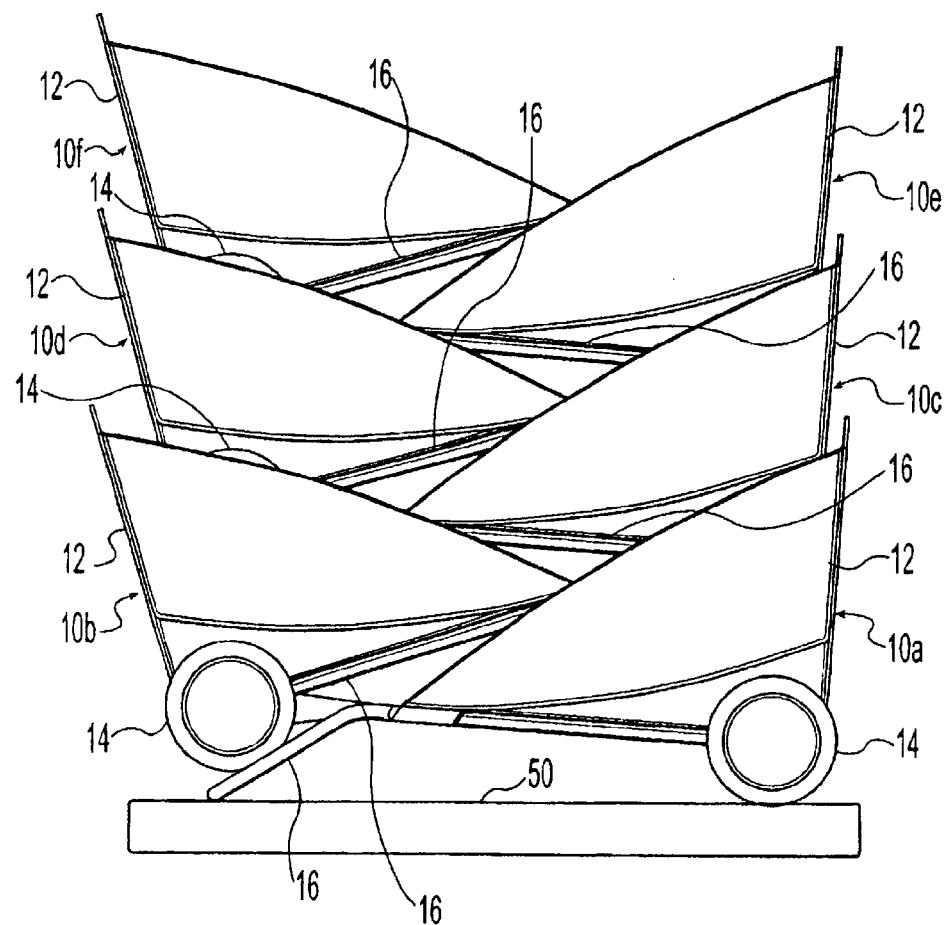
FIG. 5 is an elevational view of the yard carts of FIG. 4.

As best shown in FIGS. 4 and 5, a plurality of the yard carts 10 can be stacked one upon another in a stacked configuration. The yard carts 10 are stacked in an alternating opposed fashion such that the yard carts 10 nest together in a compact manner resulting in a reduction in the amount of space required to store the plurality of yard carts 10. As described hereinabove, the trays 12 are preferably sized to accommodate the wheels 14 and the handles 16 from other yard carts 10 so that several yard carts 110 may be stored in a nested manner. For ease of explanation, six of the yard carts 10 are shown in the figures and it should be recognized that these yard carts 10a to 10f may be substantially identical to each other and that a greater or fewer number of the yard carts 10a to 10f may be stacked.

The first or bottom yard cart 10a is positioned in a storage or laying orientation with the wheels 14 and the grasping portion 38 of the handle 16 are resting on a support surface 50 such as, for example, a floor, a shipping pallet, a display rack, or other suitable surface. The second yard cart 10b is also positioned in a storage or laying orientation but facing in a direction opposed to the first yard cart 10a and resting on top of the first yard cart 10a. The wheels 14 of the second yard cart 10b preferably rest at least partially within the grasping portion 38 of the handle 16 of the first yard cart 10a and engaging the grasping portion 38 of the handle 16 of the first yard cart 10a to limit transverse and longitudinal movement of the wheels 14 of the second yard cart 10b relative to the handle 16 of the first yard cart 10. Preferably, the wheels 14 of the second yard cart 10b do not contact the support surface 50 but if they do make contact, their rotation should be limited by the interaction with handle 16 of the first yard cart 10a. This interaction reduces the likelihood of movement, shifting, and the like of the second yard cart 10b. The handle 16 of the second yard cart 10b extends into the tray 12 of the first yard cart 10 and preferably rests on the protrusions 37 within the cavity of the first yard cart 10a. The handle 16 of the second yard cart 10b is preferably sized to be closely received within the tray 12 of the first yard cart 10a to limit transverse and longitudinal movement of the handle 16 of the second yard cart 10b relative to the tray 12 of the first yard cart 10a.

The third yard cart 10c is also positioned in a storage or laying orientation but facing in the same direction as the first yard cart 10a which is opposed to the direction of the second yard cart 10b and resting on top of the second yard cart 10b. The wheels 14 of the third yard cart 10c preferably rest at least partially within the grasping portion 38 of the handle 16 of the second yard cart 10b, which is located within the tray 12 of the first yard cart 10a, and engaging the grasping portion 38 of the handle 16 of the second yard cart 10b to limit transverse and longitudinal movement of the wheels 14 of the third yard cart 10c relative to the handle 16 of the second yard cart 10b. Preferably, the wheels 14 of the third yard cart 10c do not contact the protrusions 37 of the first yard cart 10a but if they do make contact, their rotation should be limited by the interaction with handle 16 of the second yard cart 10b. This interaction reduces the likelihood of movement, shifting, and the like of the third yard cart 10c. The handle 16 of the third yard cart 10c extends into the tray 12 of the second yard cart 10b and preferably rests on the protrusions 37 within the cavity of the second yard cart 10b. The handle 16 of the third yard cart 10c is preferably sized to be closely received within the tray 12 of the second yard cart 10b to limit transverse and longitudinal movement of the handle 16 of the third yard cart 10c relative to the tray 12 of the second yard cart 10b.

The remaining yard carts 10*d* to 10*f* are stacked in the same fashion as described above wherein they face in alternating directions to nest together and limit relative movement therebetween. Preferably, the yard carts 10 are sized and shaped to nest together as described when the stands 18 are in their stowed positions. Therefore, when preparing the yard carts 10 for stacking, the stands 18 on all yard carts are moved to their respective stowed positions.

It is noted that a second stack of the yard carts 10 may be provided adjacent the first stack. The orientation of the second stack of the yard carts 10 may be opposite that of the first stack. The opposed orientations of the stacks may allow interleaving of outer lips 26 of the yard carts 10 to enhances the stability of the stacks of the yard carts 10. Additional stacks may be provided as necessary and desired.

The ability to stack the yard carts 10 provides benefits to the manufacturer, shipper, and retailer of the yard carts 10 as well. The yard carts 10 may be shipped on industry standard pallets that may be efficiently loaded to trucks or other transport means. This provides for easy transport and storing of the yard carts 10. The yard carts 10 may also be displayed to the consumer in the same fashion.

Figure 6:
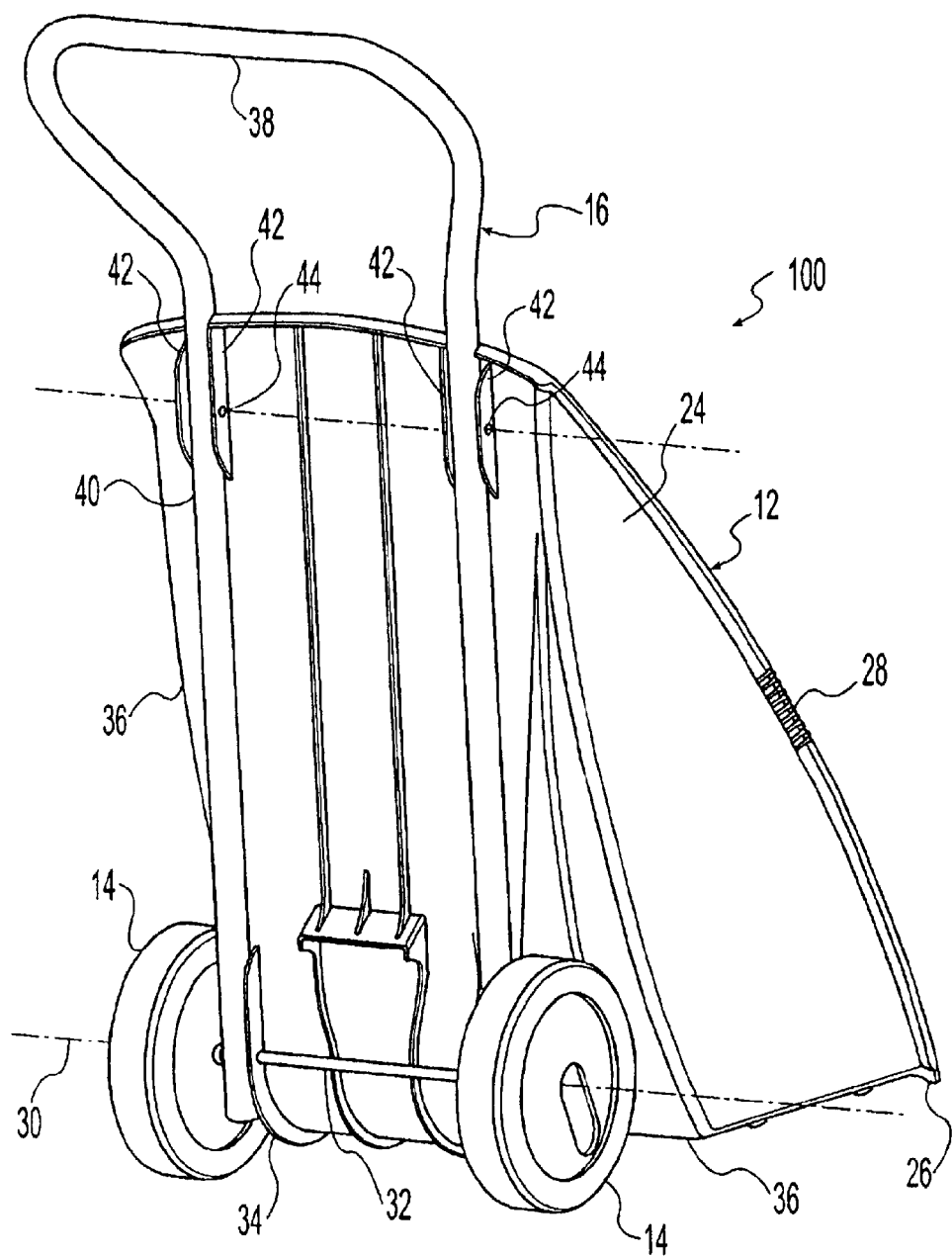
FIG. 6 is a rear perspective view of a yard cart according to a second embodiment of the present invention wherein the yard cart is in a generally vertical orientation.

FIG. 6 shows a yard cart 100 according to a second embodiment of the present invention wherein like numerals are used to indicate like structure. The yard cart 100 according to the second embodiment is substantially the same as the yard cart 10 according to the first embodiment except that the stand 18 is not included. When stacked as depicted in FIGS. 4 and 5, the handles 16 of the yard carts 100 are at least partially within with the tray 12 of the yard cart 100 directly therebelow and the wheels 14 of the yard carts 100 are at least partially within the handle 16 of the yard cart 100 directly therebelow as described above with regard to the first embodiment to nest the yard carts together in a compact manner.

Figure 7:
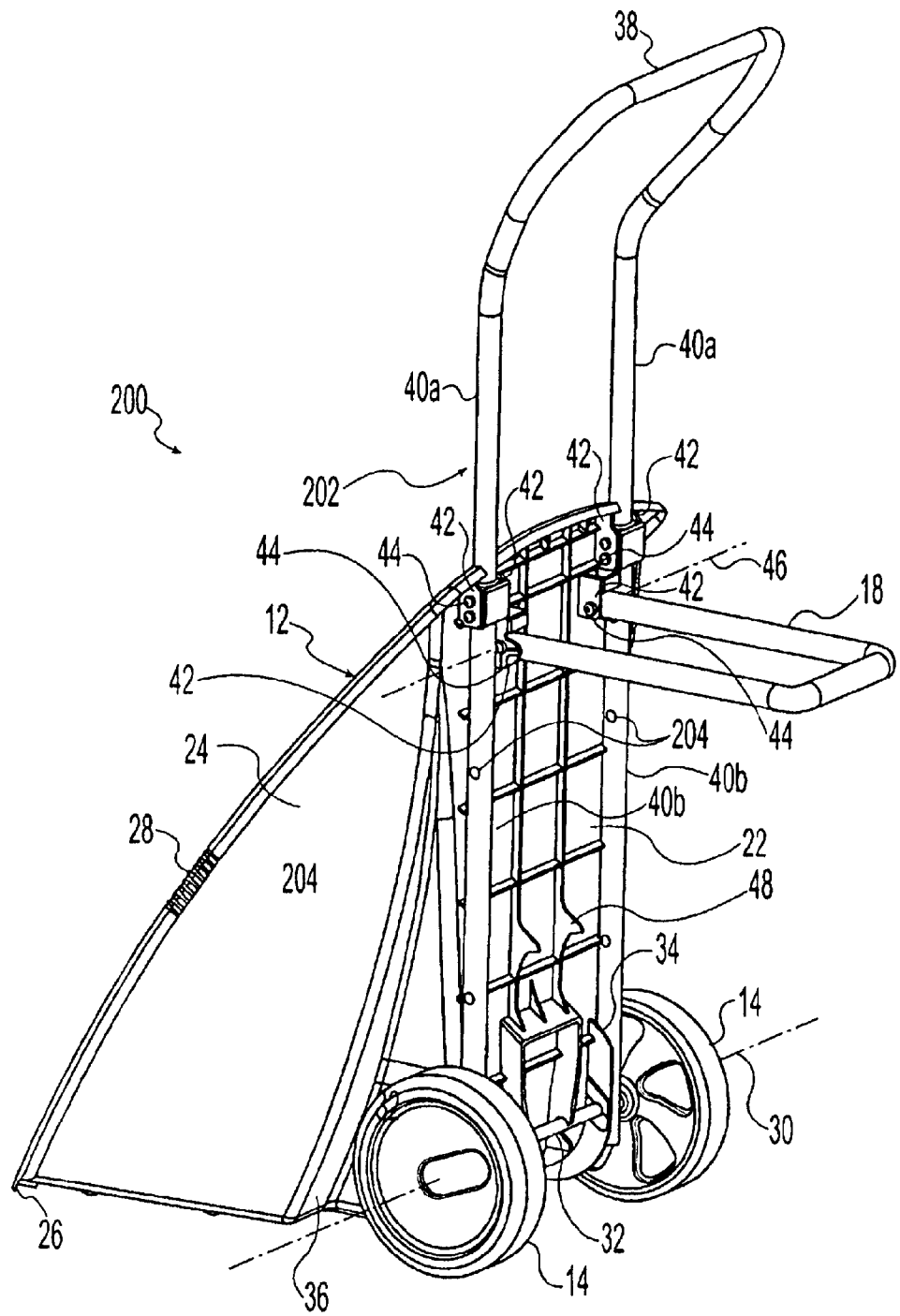
FIG. 7 is a rear perspective view of a yard cart according to a third embodiment of the present invention wherein the yard cart is in a generally vertical orientation and both a handle and a stand are each in an extended position.
Figure 8:
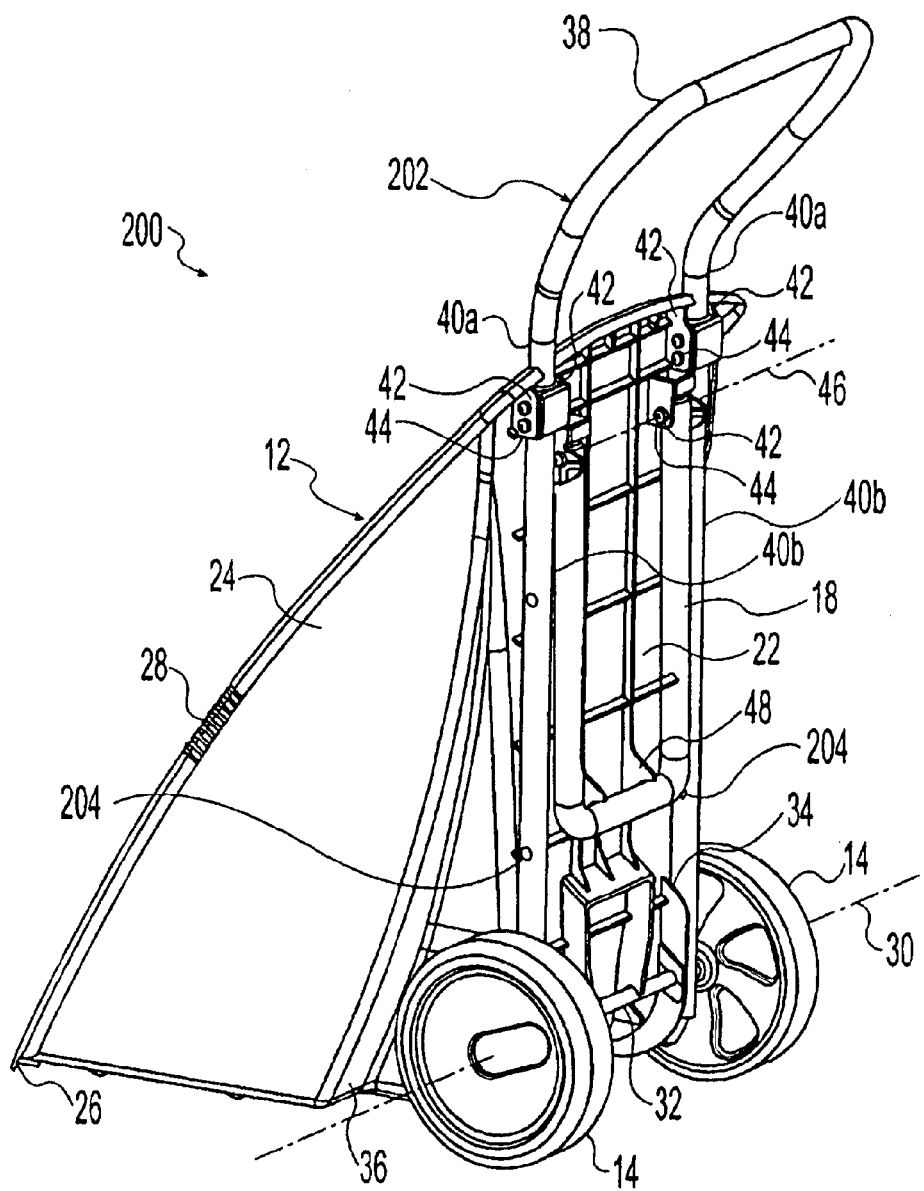
FIG. 8 is a rear prospective view of the stackable yard cart of FIG. 7 with the handle in a retracted position.

FIGS. 7 and 8 shows a yard cart 200 according to a third embodiment of the present invention wherein like numerals are used to indicate like structure. The yard cart 200 according to the third embodiment is substantially the same as the yard cart 10 according to the first embodiment except that an extendable handle 202 is provided and the stand 18 is secured to different upper flanges 42 than the handle 202. The handle 202 is movable between an extended position (FIG. 7) a stowed or retracted position (FIG. 8) wherein the grasping portion 38 of the handle 202 is closer to the tray 12 than when in the extended position.

The connecting portion of the handle 202 comprises at least two parts, including an upper part 40*a* and a lower part 40*b*. The upper part 40*a* is slidingly coupled to lower part 40*b* such that the upper part 40*a* is movable relative to the lower part 40*b*. The grasping portion 38 is secured to and moves with the upper part 40*a* of the connecting portion 40 so that the grasping portion 38 moves toward and away from the tray 12 as the upper part 10*a* moves relative to the lower part. The lower part 40*b* is rigidly secured to the tray 12. The illustrated upper and lower parts are pairs of telescoping inner and outer tubes. In the illustrated embodiment, the upper part 40*a* is the inner tube and the lower part 40*b* is the outer tube but the tubes can be reversed within the scope of the present invention.

The moving upper part 40*a* is preferably controlled by a suitable latch or securing mechanism 204 which releasably secures the upper part 40*a* in at least the extended position and the and the retracted position. The illustrated latch 204 is in the form of a detent carried by the upper part 40*a* that cooperates with openings in the lower part 40*b* to releasably lock the upper part 40*a* in the extended position and the retracted position. It is noted that additional openings can be provided to enable the upper part 40*a* to be secured in positions in between the extended position and the retracted position. It is also noted that the latch can be any other form known in the art such as, for example, pins, clips, cams, and any other suitable locks.

When stacked as depicted in FIGS. 4 and 5, the handles 202 of the yard carts 200 are at least partially within with the tray 12 of the yard cart 200 directly therebelow and the wheels 14 of the yard carts 200 are at least partially within the handle 202 of the yard cart 200 directly therebelow as described above with regard to the first embodiment to nest the yard carts together in a compact manner. Preferably, the yard carts 200 are sized and shaped to nest together as described when both the handles 202 and the stands 18 are in their stowed positions. Therefore, when preparing the yard carts 200 for stacking, the handles 202 and the stands 18 on all yard carts are moved to their respective stowed or retracted positions.

Figure 9:
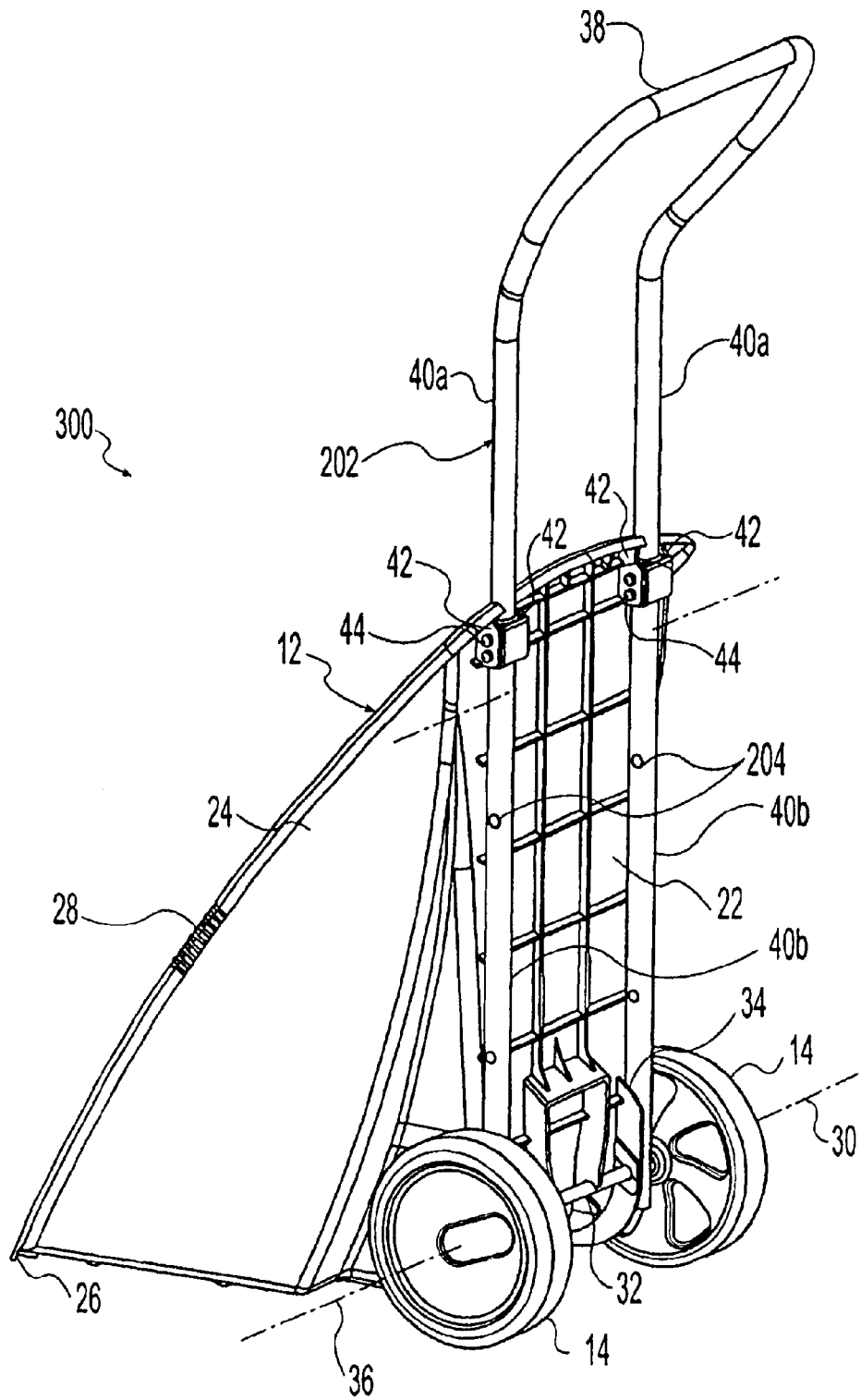
FIG. 9 is a rear perspective view of a yard cart according to a fourth embodiment of the present invention wherein the yard cart is in a generally vertical orientation and a handle is in an extended position.

FIG. 9 shows a yard cart 300 according to a fourth embodiment of the present invention wherein like numerals are used to indicate like structure. The yard cart 300 according to the fourth embodiment is substantially the same as the yard cart 200 according to the third embodiment except that the stand 18 is not included. When stacked as depicted in FIGS. 4 and 5, the handles 202 of the yard carts 300 are at least partially within with the tray 12 of the yard cart 300 directly therebelow and the wheels 14 of the yard carts 300 are at least partially within the handle 202 of the yard cart 300 directly therebelow as described above with regard to the first embodiment to nest the yard carts together in a compact manner. Preferably, the yard carts 300 are sized and shaped to nest together as described when the handles 202 are in their stowed positions. Therefore, when preparing the yard carts 200 for stacking, the handles 202 on all yard carts are moved to their retracted positions.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A stackable cart upon which another cart can be stacked thereon, the stackable cart comprising, in combination:

a tray;

wherein the tray forms a storage cavity having an access opening;

a handle connected to the tray;

a plurality of wheels rotatably secured to the tray;

wherein the tray is configured to receive at least a portion of a handle of the another cart within the storage cavity of the tray when the another cart is stacked on the stackable cart; and wherein the handle is configured to receive at least a portion of each of a plurality of wheels of the another cart with the plurality of wheels of the another cart located outside the storage cavity of the tray when the another cart is stacked on the stackable cart.

2. The stackable cart according to claim 1, further comprising a stand secured to the tray and movable between a first position and a second position.

3. The stackable cart according to claim 1, wherein the tray forms a lip extending about a periphery of the access opening.

4. The stackable cart according to claim 3, wherein the lip is located along an outer surface of the tray.

5. The stackable cart according to claim 3, wherein the lip comprises at least one grip.

6. The stackable cart according to claim 1, wherein the handle is extendable in a telescopic manner.

7. The stackable cart according to claim 1, wherein the handle comprises:
- a lower part;
- an upper part; and
- wherein the upper part and lower part are slidably coupled.

8. The stackable cart according to claim 7, wherein the handle further comprises a latch that controls slidable movement of the upper part with respect to the lower part.

9. The stackable cart according to claim 1, wherein the tray and the handle are configured to nest together with the another cart when the another cart is stacked on the stackable cart.

10. The stackable cart according to claim 1, wherein the tray includes a bottom wall, an end wall extending from one end of the bottom wall, and a pair of side walls extending from lateral sides of the bottom wall, the side walls are each triangular shaped such that the storage cavity is wedge-shaped, the handle extends from an end of the tray opposite the end wall, and the plurality of wheels are located at an end of the tray near the end wall.

11. A stacked configuration of carts comprising, in combination:
- first and second carts each including:
  - a tray;
  - wherein the tray forms a storage cavity having an access opening;
  - a handle connected to the tray, and
  - a plurality of wheels rotatably secured to the tray;
- wherein the second cart is vertically stacked upon the first cart with the second cart oriented in an opposed direction to the first cart;
- wherein the tray of the first cart receives at least a portion of the handle of the second cart within the storage cavity of the first cart to limit movement of the second cart relative to the first cart; and
- wherein the handle of the first cart receives at least a portion of each of the plurality of wheels of the second cart with the plurality of wheels of the second cart located outside the storage cavity of the first cart to limit movement of the second cart relative to the first cart.

12. The stacked configuration of carts according to claim 11, wherein the first and second carts are nested together.

13. The stackable cart according to claim 11, wherein the handle of both the first and second carts is extendable in a telescopic manner between a retracted position and a extended position and the handle of each the first and second carts is in the retracted position.

14. The stackable cart according to claim 11, further comprising additional carts each including a tray, a handle connected to the tray, and a plurality of wheels rotatably secured to the tray and wherein the additional carts are vertically stacked upon the first and second carts and oriented in alternating opposed directions.

15. The stacked configuration of carts according to claim 11, wherein any additional carts and the first and second carts are nested together.

16. The stacked configuration of carts according to claim 11, wherein tray of each of the first and second carts includes a bottom wall, an end wall extending from one end of the bottom wall, and a pair of side walls extending from lateral sides of the bottom wall, the side walls are each triangular shaped such that the storage cavity is wedge-shaped, the handle extends from an end of the tray opposite the end wall, and the plurality of wheels are located at an end of the tray near the end wall.

17. The stacked configuration of carts according to claim 11, further comprising a third cart including a tray, a handle connected to the tray, and a plurality of wheels rotatably secured to the tray, wherein the third cart is vertically stacked upon the second cart with the third cart oriented in an opposed direction to the second cart, wherein the handle of the second cart receives at least a portion of each of the plurality of wheels of the third cart within the storage cavity of the tray of the first cart to limit movement of the third cart relative to the second cart, and wherein the tray of the second cart receives at least a portion of the handle of the third cart within the storage cavity of the second cart to limit movement of the third cart relative to the second cart.

18. A stacked configuration of carts comprising, in combination:
- first and second carts each including:
  - a tray;
  - a handle connected to the tray, and
  - a plurality of wheels rotatably secured to the tray;
- wherein the second cart is vertically stacked upon the first cart with the second cart oriented in an opposed direction to the first cart;
- wherein the tray of the first cart receives at least a portion of the handle of the second cart therein to limit movement of the second cart relative to the first cart; and
- wherein the handle of the first cart receives at least a portion of each of the plurality of wheels of the second cart therein to limit movement of the second cart relative to the first cart; and
- wherein the first and second carts further include a stand secured to the tray and movable between a stowed position and an extended position and the stand of each the first and second carts is in the stowed position.

* * * * *